April 26, 1932.  E. OPPEN  1,855,412

PROCESS FOR THE PRODUCTION OF A GASEOUS CATALYST

Filed May 22, 1928

Inventor:
Erich Oppen,
By Byrnes Townsend & Brickenstein,
Attorneys.

Patented Apr. 26, 1932

1,855,412

UNITED STATES PATENT OFFICE

ERICH OPPEN, OF HANOVER, GERMANY, ASSIGNOR, BY MESNE ASSIGNMENTS, TO INTERNATIONAL PRECIPITATION COMPANY, OF LOS ANGELES, CALIFORNIA, A CORPORATION OF CALIFORNIA

PROCESS FOR THE PRODUCTION OF A GASEOUS CATALYST

Application filed May 22, 1928, Serial No. 279,821, and in Germany February 14, 1928.

This invention relates to a process for the production of a gaseous catalyst.

Gaseous catalysts are frequently made use of in order to carry out chemical reactions. Thus for example, in the transformation of sulphurous acid into sulphuric acid, gaseous nitric oxide is employed, which is usually produced by an electric arc or discharge.

It has now been found that it is possible to employ a minimum amount of gaseous catalyst for example nitric oxide, if according to the invention it is deposited on a solid substance with which the reaction mixture to be catalyzed is contacted. This deposition can be carried out in the most simple manner by allowing the electric spark producing the catalyst to discharge along the surface of an electric non-conductor or semi-conductor. Quartz has been found particularly suitable for this purpose; nevertheless other substances such as for example porcelain, marble or the like may also be employed if desired.

The non- or semi-conductor may be irrigated or cooled by an insulating liquid, for example oil, in case it is necessary to keep the temperature of the gaseous catalyst low. This cooling liquid may simultaneously be employed as adsorption medium for the catalyst. Moreover no difficulties are encountered if the apparatus is so arranged that the cooling or irrigating liquid for the non- or semi-conductor is conducted in a cycle, that is to say, used repeatedly.

The non- or semi-conductor, along the surface of which the electric discharge is to take place, may be arranged to be either stationary or movable, for example to rotate. The movable arrangement has the advantage that the electric sparks continually impinge against fresh portions of the semi- or non-conductor which are free from nitric oxide.

In order more clearly to understand the invention, reference is made to the accompanying drawings which illustrate by way of example several methods of carrying out the invention and in which:—

Figure 1:
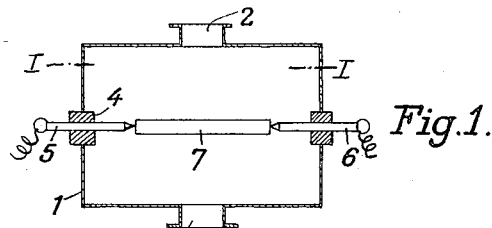
Fig. 1 is a vertical longitudinal section through one embodiment of catalyst chamber.
Figure 2:
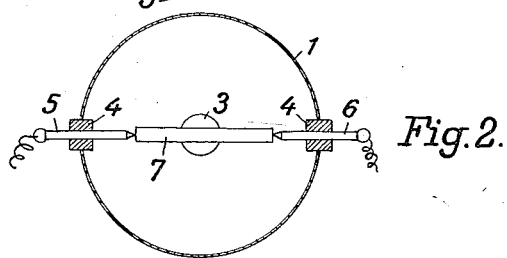
Fig. 2 is a transverse section along the line I—I of Fig. 1.

In the embodiment illustrated in Figs. 1 and 2, 1 indicates a casing provided with a gas inlet 2 and a gas outlet 3. The gas may however also enter at 3 and leave at 2.

In the walling of the casing are arranged two axially and oppositely disposed high tension electrodes 5 and 6 which are insulated at 4 and which carry between them a quartz rod 7.

The electric discharges between the electrodes 5 and 6 creep over the quartz rod 7 without the non-conductive capacity of the quartz being destroyed by any increase in temperature.

Figure 3:
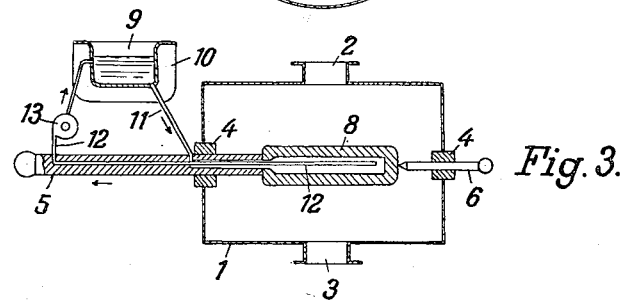
Fig. 3 is a vertical longitudinal section of an apparatus with a cooled non- or semi-conductor.

In the embodiment illustrated in Fig. 3 the non- or semi-conductor is arranged between the two electrodes 5 and 6 in the form of a hollow body 8 along the surface of which the electric discharges take place. A cooling liquid, for example oil, is kept in circulation through the interior of the hollow body 8. For this purpose, there is provided a container 9, preferably having gills 10, which communicates with the interior of the hollow body 8 through a tube 11. The cooling liquid is pumped back into the container 9 from the hollow body 8 through a second tube 12 by means of a suitable conveyor device, for example a rotary pump 13. The conduits 11 and 12 are partly situated in the interior of the electrode 5 and serve partly as supports for the container 9. It is obvious that the entire circulating system viz., pump 9, tubes 11 and 12 and pump 13 must be insulated. In any case however it is necessary that the pump 13 should be insulated if the tubes 11, 12 are not constructed of quartz or any other insulating substance.

Figure 4:
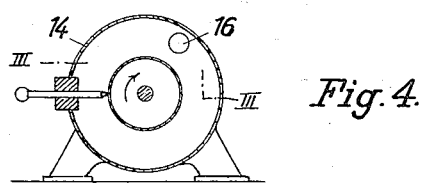
Fig. 4 is a cross-section along the line II—II of Fig. 5, showing an apparatus with a rotating non- or semi-conductor.
Figure 5:
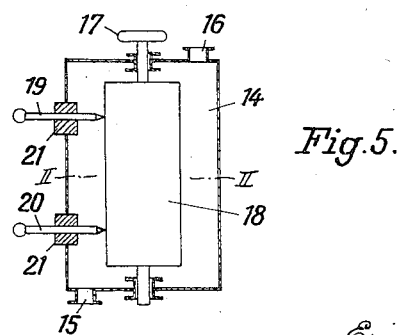
Fig. 5 is a plan view along the line III—III of Fig. 4.

In the embodiment illustrated in Figs. 4 and 5 the casing is constituted by a stationary drum 14 which is provided with a gas inlet 15 and a gas outlet 16. In the axis of the casing there rotates a drum or roller 18 formed of an electrically non- or semi-conductive substance (for example quartz) which is driven for example through the pulley 17. Contacting with this roller 18 are the two electrodes 19 and 20 which are mounted in the wall of the casing 14 and are insulated therefrom at 21. As can be seen from the drawing, on rotation of the roller 18 fresh surfaces along which the electrical discharges glide, are continually exposed between the electrodes 19 and 20.

The electrodes 19 and 20 may obviously also be oppositely situated with the drum 18 lying between them.

I claim:—

1. Method of catalyzing a chemical reaction between sulfur dioxide and oxygen which comprises generating nitric oxide as a gaseous catalyst for the chemical reaction and depositing said gaseous catalyst on the surface of a solid body which is in contact with the sulfur dioxide and oxygen involved in said chemical reaction by means of electrical discharges over the surface of said solid body.

2. Method of catalyzing chemical reactions as defined in claim 1 in which the electrical discharges are caused to travel along the surface of a moving solid body of low electrical conductivity.

3. Method of catalyzing a chemical reaction as defined in claim 1 in which the solid body is cooled by flowing in contact therewith an inert non-conductive liquid.

4. Method of catalyzing a chemical reaction as defined in claim 1 in which a non-conductive liquid capable of adsorbing the gaseous catalyst is flowed over the surface of the solid body.

5. Process of generating nitric oxide as a gaseous catalyst for use in a reaction between sulfur dioxide and oxygen which comprises contacting a solid body of low electrical conductivity with high tension electrodes of opposite polarity.

6. Process of generating a gaseous catalyst as defined in claim 5 in which said body of low electrical conductivity is quartz.

7. Process of generating a gaseous catalyst as defined in claim 5 in which the body is caused to move in contact with the electrodes and is cooled by contact with a cooling fluid.

In testimony whereof I affix my signature.

ERICH OPPEN.